R. A. COBB.

TUBULAR LANTERN.

No. 10,841. Reissued June 7, 1887.

WITNESSES

Wm. M. Morse

Dan Martin

INVENTOR

Rollin A. Cobb by

H. J. Fisher

ATTORNEY

N. PETERS, Photo-Lithographer, Washington, D. C.

UNITED STATES PATENT OFFICE.

ROLLIN A. COBB, OF WARREN, OHIO.

TUBULAR LANTERN.

SPECIFICATION forming part of Reissued Letters Patent No. 10,841, dated June 7, 1887.

Original No. 355,385, dated January 4, 1887. Application for reissue filed May 11, 1887. Serial No. 237,898.

*To all whom it may concern:*

Be it known that I, ROLLIN A. COBB, a citizen of the United States, residing at Warren, in the county of Trumbull and State of Ohio, have invented certain new and useful Improvements in Tubular Lanterns; and I do hereby declare that the following is a full, clear, and exact description of the invention, which will enable others skilled in the art to which it appertains to make and use the same.

My invention relates to improvements in lanterns; and it consists in a lantern having a glass fount, a casing with openings to view the contents of the fount, and tubes to supply air to the burner, in the manner substantially as shown and described, and pointed out in the claims.

Figure 1:
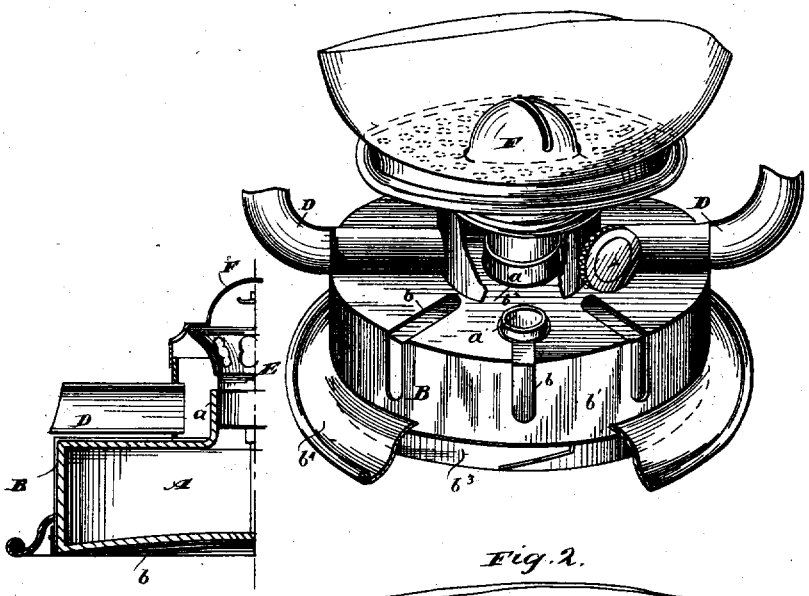
Figure 2:
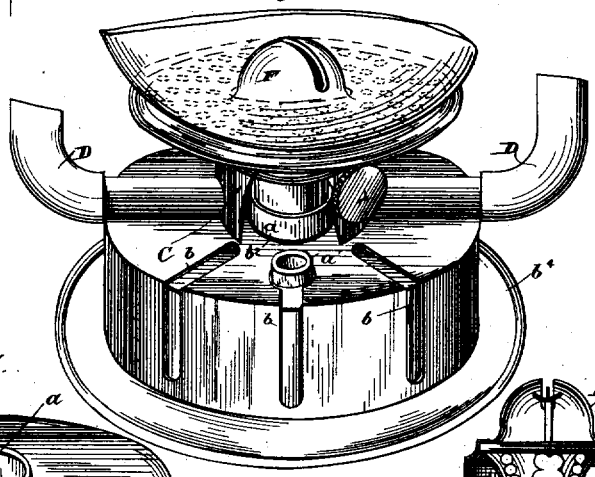
Figure 4:
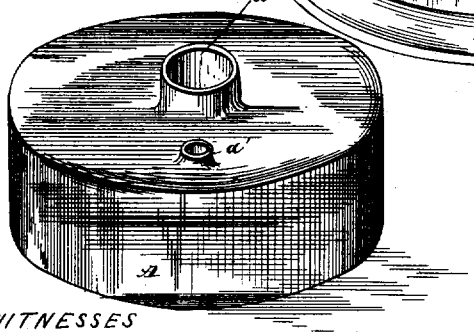
Figure 3:
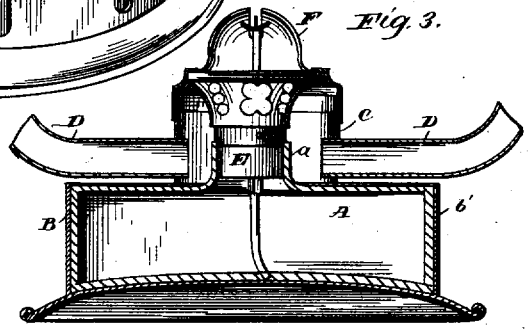

Referring to the drawings, Figure 1 is a perspective, partly in section, of a lantern, showing my improved construction, a side view of a section of the fount and its surrounding parts, showing the details of construction more clearly. Fig. 2 is a perspective corresponding to Fig. 1, with a somewhat differently-formed case for the fount. Fig. 3 is a vertical section through the center of Fig. 2. Fig. 4 is a perspective of the glass fount detached.

In the drawings, A represent the glass fount, shaped, preferably, as shown, and having a neck, $a$, for the attachment of the burner, and an opening, $a'$, to pour in the oil.

B is the case or receptacle for holding the fount, formed of sheet metal—such as tin or brass—and having slots or openings $b$ at its top and sides. These openings may be one or more in number, and may be exclusively on the top or at the sides, or on both, as shown, the object of the openings being to disclose the quantity and condition of the oil in the fount. The style or shape of the openings, therefore, is not material, but they should be made of such size that while they admit sufficient light and room to view the state of the oil in the fount, they are not so large as to endanger the fount by exposure; and the body of the case being of service chiefly to protect the fount from injury or breakage, its vertical sides $b'$ might be made of different material from the top and base. The top is provided with an opening, $b^2$, within which the neck of the fount is closely fitted, so as to prevent the passage of air at that point, as well as hold it securely against shaking or slipping from side to side, in the event it does not fit snugly between the walls of the case.

In Fig. 1 and its sectional detail I have shown the case as having a cap-shaped bottom, $b^3$, and inclined slots and lugs on its sides, so that the cap may be firmly attached to support the fount, but removable when for any reason it is desired to remove the fount from its seat. I am not particular about the form of the bottom or the means of attaching it, as others equally good are obvious, and may be used, if preferred. If a removable bottom be used, it may be preferable to attach the base-flange $b^4$ some distance up on the side of the case, as shown in Fig. 1; but if the bottom is not removable and the parts are permanently united, as shown in Figs. 2 and 3, the bottom and base-flange can be formed in one piece, as shown in said figures. It is expected that the case will so thoroughly protect the glass fount against accidents that breakage will not be at all liable to occur, in which event it were as well at least that the fount should be permanently incased.

C represents the air-chamber fixed to the top of the case, and provided with perforations at its sides for the introduction of the air or draft tubes D.

E is the burner, which fits snugly in the neck of the glass fount, and the cone F being placed in position on the chamber C no air is admitted to the burner from any source, except what enters through the tubes D.

I am aware that a lantern with a glass fount and a lamp with a glass fount and a closed metal jacket are old in the art; but I am not aware that a lantern bearing the distinguishing features disclosed by my claims has ever before been known or used.

Having thus described my invention, what I claim, and desire to secure by Letters Patent, is—

1. In a lantern, a glass oil-fount provided with a burner having an air-chamber, in combination with a case or shell which envelops the fount, and has slots or openings to view the contents of the fount and tubes to supply air to the said chamber, substantially as set forth.

2. In a lantern, a glass oil-fount provided with a burner, in combination with a case or shell having openings through which to view the contents of the fount, and a bottom detachably secured to the case and supporting the fount, substantially as set forth.

3. In a lantern, a glass fount having a neck and a burner secured therein, in combination with a case or shell having openings at its sides and a central opening on top, which fits closely about the neck of the fount, an air-chamber formed by a plate secured to the case and encircling the neck below the burner, and tubes to supply air to said chamber, substantially as set forth.

ROLLIN A. COBB.

Witnesses:
W. H. RAYMOND,
C. H. KOONES.